(12) United States Patent
Bluemel et al.

(10) Patent No.: US 7,988,780 B2
(45) Date of Patent: *Aug. 2, 2011

(54) TITANIUM DIOXIDE PIGMENT PARTICLES WITH DOPED, DENSE SIO$_2$ SKIN AND METHODS FOR THEIR MANUFACTURE

(75) Inventors: Siegfried Bluemel, Ratigen (DE); Lydia Drews-Nicolai, Köln (DE)

(73) Assignee: Kronos International Inc (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/843,077

(22) Filed: Jul. 26, 2010

(65) Prior Publication Data

US 2010/0282128 A1    Nov. 11, 2010

Related U.S. Application Data

(63) Continuation of application No. 11/668,692, filed on Jan. 30, 2007, now Pat. No. 7,605,672.

(60) Provisional application No. 60/772,919, filed on Feb. 13, 2006.

(30) Foreign Application Priority Data

Jan. 30, 2006   (DE) .................. 10 2006 004 345
Nov. 22, 2006   (DE) .................. 10 2006 054 988

(51) Int. Cl.
*C09C 1/36*      (2006.01)
*C01G 23/047*    (2006.01)
*D06N 7/04*      (2006.01)
*E01F 9/04*      (2006.01)
*E04D 7/00*      (2006.01)
*B32B 5/16*      (2006.01)
*B32B 9/00*      (2006.01)
*B32B 15/02*     (2006.01)
*B32B 17/02*     (2006.01)
*B32B 19/00*     (2006.01)
*B32B 21/02*     (2006.01)
*B32B 23/02*     (2006.01)
*B32B 27/02*     (2006.01)

(52) U.S. Cl. ........ 106/446; 106/442; 106/443; 423/610; 423/611; 423/612; 428/403; 428/143; 428/144; 428/145

(58) Field of Classification Search .............. 106/446, 106/442, 443; 423/610–612; 428/403, 143–145
See application file for complete search history.

(56) References Cited

U.S. PATENT DOCUMENTS

| | | | | | |
|---|---|---|---|---|---|
| 3,928,057 | A * | 12/1975 | DeColibus | .................... | 106/446 |
| 5,451,252 | A * | 9/1995 | Elfenthal et al. | .............. | 106/436 |
| 5,730,795 | A * | 3/1998 | Herkimer | ..................... | 106/446 |
| 5,922,120 | A * | 7/1999 | Subramanian et al. | ....... | 106/437 |
| 7,029,648 | B2 * | 4/2006 | Subramanian et al. | ....... | 423/613 |
| 7,135,065 | B2 * | 11/2006 | Drews-Nicolai et al. | ..... | 106/436 |
| 7,244,302 | B2 * | 7/2007 | Schumacher et al. | ........ | 106/446 |
| 7,371,276 | B2 * | 5/2008 | Takahashi et al. | ............ | 106/443 |
| 7,763,110 | B2 * | 7/2010 | Bluemel et al. | ............... | 106/446 |
| 2006/0032402 | A1 * | 2/2006 | Drews-Nicolai et al. | ..... | 106/436 |

* cited by examiner

*Primary Examiner* — Patricia L Hailey
(74) *Attorney, Agent, or Firm* — Rodney T. Hodgson

(57) ABSTRACT

A method of predicting photostability of coatings with various dopants on titanium dioxide pigment particles is disclosed. Calculations of the density of states show that a doped coating which reduces the density of states near the band edge or increases the density of states within the band gap of the pigment particles increases the photostability of the doped pigment.

19 Claims, 18 Drawing Sheets

Orbital Energies: (a) atom, (b) small molecule, (c) large molecule, (d) solid and (e) corresponding density of states Orbital Energies: (a) atom, (b) small molecule, (c) large molecule,
(d) solid and
(e) corresponding density of states

TITANIUM DIOXIDE PIGMENT PARTICLES WITH DOPED, DENSE SIO$_2$ SKIN AND METHODS FOR THEIR MANUFACTURE

CROSS REFERENCE TO RELATED APPLICATIONS

This application is a continuation of U.S. non-provisional application Ser. No. 11/668,692 filed on Jan. 30, 2007 (now U.S. Pat. No. 7,763,110 issued Jul. 27, 2010) which claims priority pursuant to 35 U.S.C. 119(e) of U.S. Provisional Application No. 60/772,919 filed Feb. 13, 2006, and to German applications DE102006004345.6 filed 30 Jan. 2006 and DE102006054988.8 filed 22 Nov. 2006 and is related to U.S. non-provisional application Ser. No. 11/668,729 filed filed on Jan. 30, 2007.

FIELD OF THE INVENTION

The invention relates to titanium dioxide pigment particles whose surface is provided with a dense silicon dioxide skin doped with doping elements, and methods for their manufacture. The titanium dioxide pigment particles according to the invention display improved photostability.

TECHNOLOGICAL BACKGROUND OF THE INVENTION

Because of its high refractive index, titanium dioxide is used as a high-quality pigment in many sectors, e.g. plastics, coatings, paper and fibres. However, titanium dioxide is photoactive, meaning that undesired photocatalytic reactions occur as a result of UV absorption, leading to degradation of the pigmented material [The Chemical Nature of Chalking in the Presence of Titanium Dioxide Pigments, H. G. Völz, G. Kaempf, H. G. Fitzky, A. Klaeren, ACS Symp. Ser. 1981, 151, Photodegradation and Photostabilization of Coatings].

In this context, titanium dioxide pigments absorb light in the near ultraviolet range, the result being that electron-hole pairs are produced, which lead to the formation of highly reactive radicals on the titanium dioxide surface. The radicals produced in this way result in binder degradation in organic media. It is known from experimental investigations that hydroxyl ions play a dominant role in the photocatalytic process [Photocatalytic Degradation of Organic Water Contaminants: Mechanism Involving Hyroxyl Radical Attack, C. S. Turchi, D. F. Ollis, Journal of Catalysis 122, 1990, 178-192].

It is known that the photoactivity of TiO$_2$ can be reduced by doping the TiO$_2$ particles (e.g. with aluminium) or by means of inorganic surface treatment (e.g. by coating with oxides of silicon and/or aluminium and/or zirconium) [Industrial Inorganic Pigments, ed. by G. Buxbaum, VCH, New York 1993, Seite 58-60]. In particular, several patents describe the application of the most dense possible, amorphous layer of SiO$_2$ to the particle surface, this being known as a "dense skin". The purpose of this skin is to prevent the formation of free radicals on the particle surface.

Wet-chemical methods for production of a dense SiO$_2$ skin, and of a further Al$_2$O$_3$ coating on inorganic particles, particularly on TiO$_2$, are described in U.S. Pat. No. 2,885,366, U.S. RE. 27,818 and U.S. Pat. No. 4,125,412. EP 0 245 984 B1 indicates a method which, as a result of simultaneous addition of a solution containing Na$_2$SiO$_3$ and a solution containing B$_2$O$_3$, can be performed at relatively low temperatures of 65 to 90° C.

SiO$_2$ dense-skin treatments are also carried out in order to increase the abrasion resistance of glass fibres coated in this way and reduce the slipping properties of the fibres in the products manufactured. In this connection, U.S. Pat. No. 2,913,419 describes a wet-chemical method in which silicic acid is precipitated onto the particle surface together with polyvalent metal ions, such as Cu, Ag, Ba, Mg, Be, Ca, Sr, Zn, Cd, Al, Ti, Zr, Sn, Pb, Cr, Mn, Co, Ni.

The method according to US 2006/0032402 makes it possible to increase the photostability of dense-skin TiO$_2$ pigments. It is based on the incorporation of Sn, Ti or Zr in the SiO$_2$ skin applied by a wet-chemical process.

In addition to the known wet-chemical methods for coating the surface of TiO$_2$ particles, there are also dry-chemical methods in which the dense SiO$_2$ skin is deposited from the gas phase. In this case, during titanium dioxide production by the chloride process, a silicon compound, preferably SiCl$_4$, is added to the TiO$_2$ particle stream with a temperature of over 1,000° C., such that a uniform, dense SiO$_2$ layer is formed on the particle surface.

EP 1 042 408 B1 describes a gas-phase method for surface coating with Si and B, P, Mg, Nb or Ge oxide.

SUMMARY OF THE INVENTION

The object is solved by titanium dioxide pigment particles whose surface is coated with a dense SiO$_2$ skin deposited from the gas phase and doped with at least one doping element, whereby the doping element is selected from the group consisting of Sn, Sb, In, Y, Zn, F, Mn, Cu, Mo, Cd, Ce, W and Bi as well as mixtures thereof.

The object is furthermore solved by titanium dioxide pigment particles whose surface is coated with a dense SiO$_2$ skin produced in a wet-chemical process and doped with at least one doping element, whereby the doping element is selected from the group consisting of Sb, In, Ge, Y, Nb, F, Mo, Ce, W and Bi as well as mixtures thereof.

The object is furthermore solved by a method for manufacturing titanium dioxide pigment particles whose surface is coated with a dense SiO$_2$ skin doped with at least one doping element, comprising the steps:
a) Reaction, in the gas phase, of titanium tetrachloride with an aluminium halide and a gas containing oxygen in a reactor at a temperature over 1,000° C., in order to create a particle stream containing TiO$_2$ particles,
b) Contacting of the particle stream with at least two compounds, where the first compound is a silicon oxide precursor compound and the second compound is selected from the group consisting of oxide precursor compounds of Sn, Sb, In, Y, Zn, Mn, Cu, Mo, Cd, Ce, W, Bi and precursor compounds of F as well as mixtures thereof,
c) Cooling of the particle stream, in order to create pigment particles that are coated with a dense SiO$_2$ skin doped with at least one doping element, wherein the doping elements are selected from the group consisting of Sn, Sb, In, Y, Zn, F, Mn, Cu, Mo, Cd, Ce, W and Bi as well as mixtures thereof.

Finally, a further solution to the object consists in a method for manufacturing titanium dioxide pigment particles whose surface is coated with a dense SiO$_2$ skin doped with at least one doping element, comprising the steps:
a) Provision of an aqueous suspension of TiO$_2$ particles with a pH value in excess of 10,
b) Addition of an aqueous solution of an alkaline silicon component and at least one aqueous solution of a component containing a doping element, wherein the doping element is selected from the group consisting of Sb, In, Ge, Y, Nb, F, Mo, Ce W and Bi as well as mixtures thereof.

c) Deposition of a dense $SiO_2$ skin doped with at least one doping element on the surface of the particles by lowering the pH value of the suspension to a value below 9, preferably to below 8, where the doping elements are selected from the group consisting of Sb, In, Ge, Y, Nb, F, Mo, Ce, W and Bi as well as mixtures thereof.

Further advantageous embodiments of the invention are indicated in the sub-claims.

The subject matter of the invention is coated titanium dioxide pigments that are further improved in terms of their photostability.

DETAILED DESCRIPTION OF THE INVENTION

The pigments according to the invention contain, in a dense skin on the titanium dioxide particle surface, preferably 0.1 to 6.0% by weight, and more preferably 0.2 to 4.0% by weight, silicon, calculated as $SiO_2$, and preferably 0.01 to 3.0% by weight, and more preferably 0.05 to 2.0% by weight, doping elements, calculated as oxide or, in the case of F, as element and referred to the total pigment.

In a preferred embodiment, the particles are coated with an additional layer of 0.5 to 6.0% by weight, more preferably 1.0 to 4.0% by weight, aluminium oxide or hydrous aluminium oxide, calculated as $Al_2O_3$ and referred to the total pigment.

The titanium dioxide particles are preferably rutile.

Here and below, "doping element" is to be taken to mean the respective element as atom or ion or a respective compound like an oxide, where appropriate. In the context of the description of the coatings produced by the wet-chemical process, the term "oxide" is to be taken, here and below, to also mean the corresponding hydrous oxides or corresponding hydrates. All data disclosed below regarding pH value, temperature, concentration in % by weight or % by volume, etc., are to be interpreted as including all values lying in the range of the respective measuring accuracy known to the person skilled in the art.

The invention is based on the fact that, in order to increase the photostability, the photocatalytic process must be interrupted in a suitable manner, i.e. that the production of highly reactive radicals by excited electron-hole pairs must be made more difficult. This can be achieved by utilising various mechanisms, e.g. by increasing the recombination rate of the electron-hole pairs, or by building up an energetic barrier on the pigment surface.

A dense and uniformly applied $SiO_2$ skin already builds up an energetic barrier on the $TiO_2$ surface, as detectable by a reduced energy state density near the band edge in the valence band and in the conduction band of the coated $TiO_2$ surface, compared to the untreated $TiO_2$ surface. Surprisingly, doping of the $SiO_2$ skin with selected elements leads to a further reduction in the energy state densities near the band edge, thus raising the energetic barrier and thus further improving the photostability of the $TiO_2$ pigment coated in this way.

Additional energy states within the band gap between the valence band and conduction band promote the recombination of electron-hole pairs. Doping of the $SiO_2$ layer with selected elements generates these energy states and thus effects also an improvement in photostability compared to an undoped $SiO_2$ layer.

The elements Sn, Sb, In, Ge, Y, Zr, Zn, Nb, F, Mn, Cu, Mo, Cd, Ce, W, and Bi have proven to be suitable doping components. The doped $SiO_2$ skin can be applied both by the wet-chemical method and by the gas-phase method. It is, however, known that the gas-phase method is generally capable of applying a more uniform skin than the wet-chemical method. Other elements not yet calculated are also anticipated by the inventors, and can be found by ordinary experimentation with computer calculation as shown in this specification. All such elements as have not yet been found by physical and chemical experimentation are claimed in this invention. The effective doping elements found so far, which are excluded in the claims, are doping elements selected from the group consisting of Ag, Al, B, Ba, Be, Ca, Cd, Co, Cr, Cu, Mg, Mn, Ni, Pb, Sn, Sr, Ti, Zn, and Zr for the wet chemical process, and the doping elements selected from the group consisting of Al, B, Ge, Mg, Nb, P, Zr for the dry process.

In addition, combinations of elements used as dopants can also be found by computer calculation of energy state densities and band gap states. The combination of two or more dopants can interact and produce a result which is more than either of the two dopants separately, and such synergetic combinations in the composition ranges necessary are found easily by methods of the present invention, and would be very difficult and time consuming to find by ordinary experimentation by methods introduced in the prior art.

An example of the invention is described below with the help of FIGS. 1 to 18.

FIG. 1 shows the energy states at the transition from the atom to the solid (taken from: P. A. Cox, "The Electronic Structure and Chemistry of Solids", Oxford Science Publications 1987, p. 13).

Figure 1:
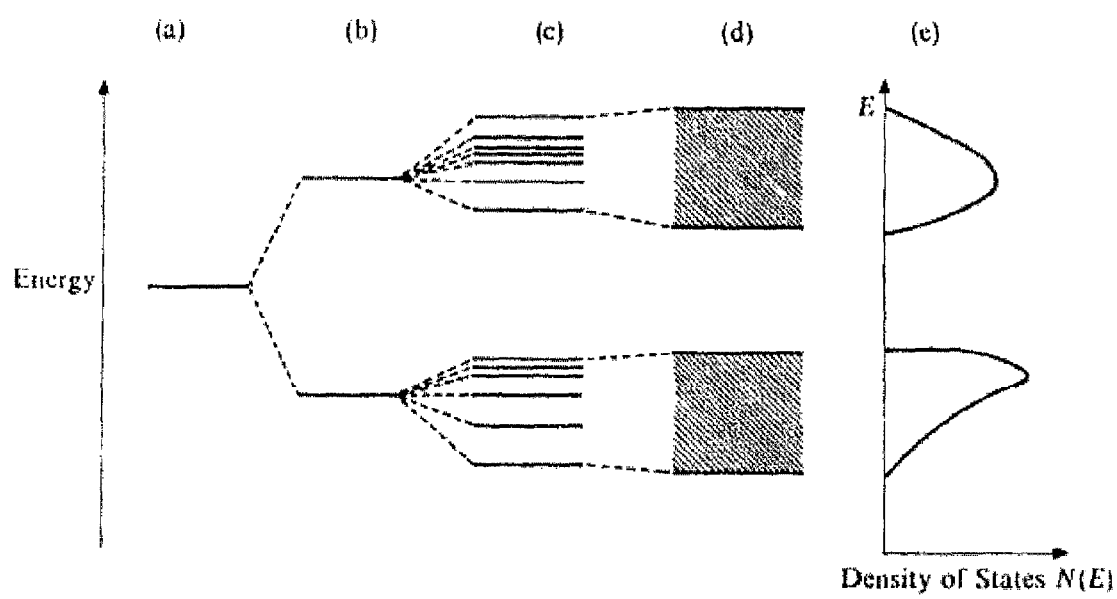

The energy state densities were calculated quantum-mechanically with the help of the CASTEP software package (Version 4.6, 1 Jun. 2001) from Accelrys Inc., San Diego. The calculations were performed using the CASTEP density functional code in the LDA (local density approximation). Detailed information has been published by V. Milman et al. in: International Journal of Quant. Chemistry 77 (2000), p. 895 to 910.

The following valence states, including the semi-core states, were used for titanium: 3s, 3p, 3d, 4s and 4p. The valence states 2s and 2p were used for oxygen, and the valence states 3s and 3p for silicon. For the doping elements, the semi-core states 4d or 4s and 4p or 2p were included for indium, yttrium and magnesium. The basic set used for the doping elements was as follows:

Sn: 5s, 5p, 6s, 6p, 7s
Sb: 5s, 5p, 6s, 6p, 7s
In: 4d, 5s, 5p, 6s, 6p, 7s
Ge: 4s, 4p, 4d
Y: 4s, 4p, 4d, 5s, 5p
Nb: 4s, 4p, 4d, 5s, 5p
F: 2s, 2p
Mn: 3d, 4s, 4p
Cu: 3d, 4s, 4p
Mo: 4s, 4p, 4d, 5s, 5p
Cd: 4d, 5s, 5p, 6s, 6p
Ce: 4f, 5s, 5p, 6s, 6p, 7s, 7p, 8s
W: 5d, 6s, 6p
Bi: 6s, 6p, 7s, 7p, 8s
Mg: 2p, 3s, 3p
Al: 3s, 3p

The kinetic energy cut-off for the plane waves was 380 eV. Structural geometric optimisation was not performed, since the mathematical model could be evaluated and confirmed on the basis of known experimental results (coating with Sn, Al, Zr and Zn). Thus, the model calculations yield sufficient accuracy for examination of the photostability.

The state density calculations were based on a grid according to the Monkhorst-Pack scheme. The surface calculations were performed in accordance with the "slab model method" with a vacuum thickness of 10 Å.

Examples

The invention is explained on the basis of Examples 1 to 14 (doping of the $SiO_2$ layer with one of the doping elements Sn, Sb, In, Ge, Y, Nb, F, Mn, Cu, Mo, Cd, Ce, W, Bi), Comparative Example 1 (pure $SiO_2$ layer), Comparative Example 2 (doping of the $SiO_2$ layer with Mg) and Comparative Example 3 (doping of the $SiO_2$ layer with Al).

The calculation for Comparative Example 1 is based on complete coverage of a $TiO_2$ (110) surface with an $SiO_2$ monolayer. In this context, the unit cell comprises 52 atoms ($Ti_8Si_8O_{36}$). Applied to the pigment, the calculated monomolecular coverage with $SiO_2$ with a layer thickness of approximately 0.2 nm corresponds to a percentage by weight of roughly 0.3% by weight $SiO_2$, referred to $TiO_2$.

The percentage by weight was calculated on the basis of the following values: typical value of the specific surface (to BET) for $TiO_2$ particles manufactured by the chloride process: $6.2 \, m^2/g$; thickness of the monomolecular layer: 0.2 nm; density of the $SiO_2$ layer: $2.2 \, g/cm^3$.

Examples 1 to 14 and Comparative Examples 2 and 3 describe coverage of the $TiO_2$ surface with a monomolecular $SiO_2$ layer doped at an atomic ratio of 1 (doping element X):7 (Si), i.e. the unit cell comprises $Ti_8Si_7X_1O_{36}$. Applied to the $TiO_2$ pigment, this results in the following percentages by weight of the doping elements, calculated as oxide and referred to $TiO_2$:

Example 1: roughly 0.10% by weight $SnO_2$,
Example 2: roughly 0.09% by weight $Sb_2O_3$,
Example 3: roughly 0.09% by weight $In_2O_3$,
Example 4: roughly 0.07% by weight $GeO_2$,
Example 5: roughly 0.14% by weight $Y_2O_3$,
Example 6: roughly 0.09% by weight $Nb_2O_5$,
Example 7: roughly 0.01% by weight F,
Example 8: roughly 0.06% by weight $MnO_2$,
Example 9: roughly 0.06% by weight CuO,
Example 10: roughly 0.10% by weight $MoO_3$,
Example 11: roughly 0.09% by weight CdO,
Example 12: roughly 0.12% by weight $CeO_2$,
Example 13: roughly 0.16% by weight $WO_3$,
Example 14: roughly 0.09% by weight $Bi_2O_3$,
Reference Example 2: roughly 0.03% by weight MgO,
Reference Example 3: roughly 0.04% by weight $Al_2O_3$ Results The result of the quantum-mechanical CASTEP calculations is the electronic structure. This can be analysed in the form of band structures (energy bands spatially resolved) or the state densities (integrated energy states).

FIG. 1 shows a simplified block diagram (d) of the electronic structure. The block diagram reflects only the energy bandwidth and position of the energy band. The state density (e) is used for the energy state distribution within the energy band.

Figure 2:
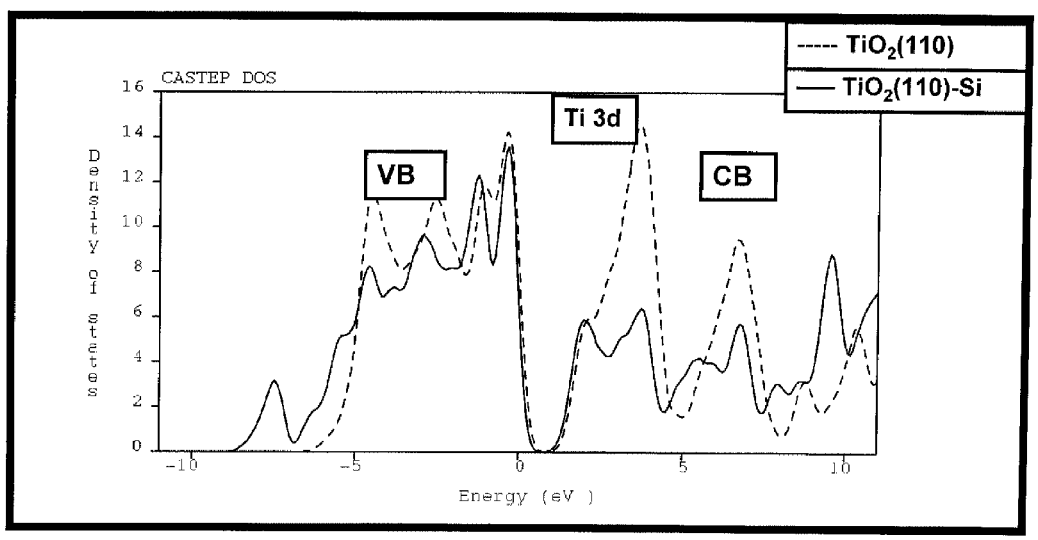
FIG. 2 shows the energy state density of the $TiO_2$ surface without and with $SiO_2$ coating.

FIG. 2 shows the effect of a pure, undoped $SiO_2$ coating (Comparative Example 1) on the photoactivity of the $TiO_2$: the calculated state density of the pure $TiO_2$ (110) surface is shown as a broken line, that of the $SiO_2$-coated surface as a solid line. The positive effect of the $SiO_2$ coating on photostability is partly based on the reduction of the state density in the conduction band (CB) near the band edge, compared to the uncoated $TiO_2$ surface, this reducing the transfer of electron-hole pairs to the surrounding matrix. At the same time, the positive effect is intensified by the fact that there is additionally a reduction in the state density near the band edge in the valence band (VB).

Figure 3:
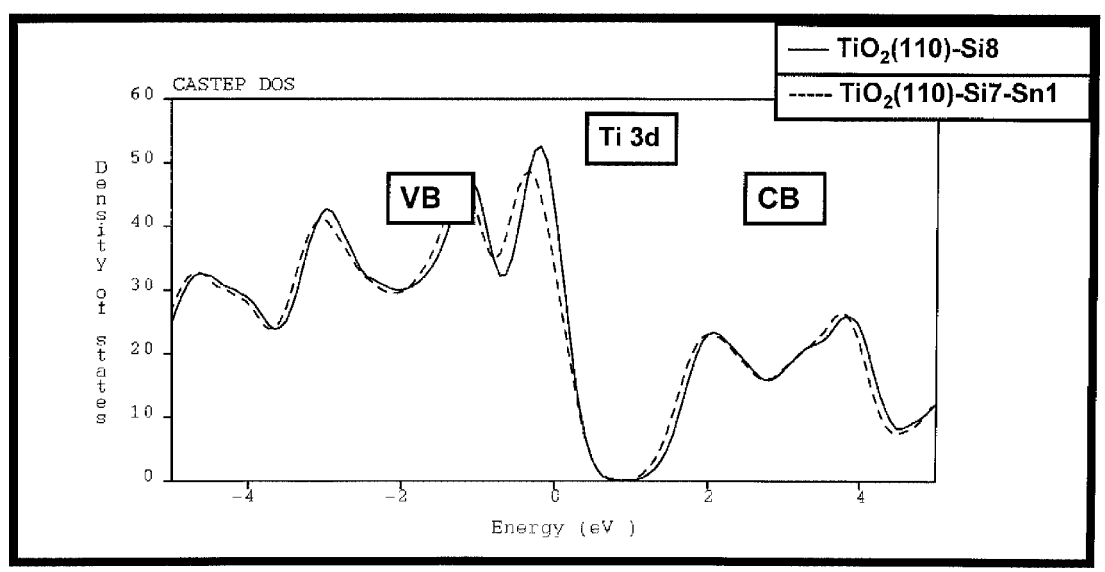
FIG. 3 shows the energy state density of the $TiO_2$ surface with $SiO_2$ coating and with Sn-doped $SiO_2$ coating.
Figure 4:
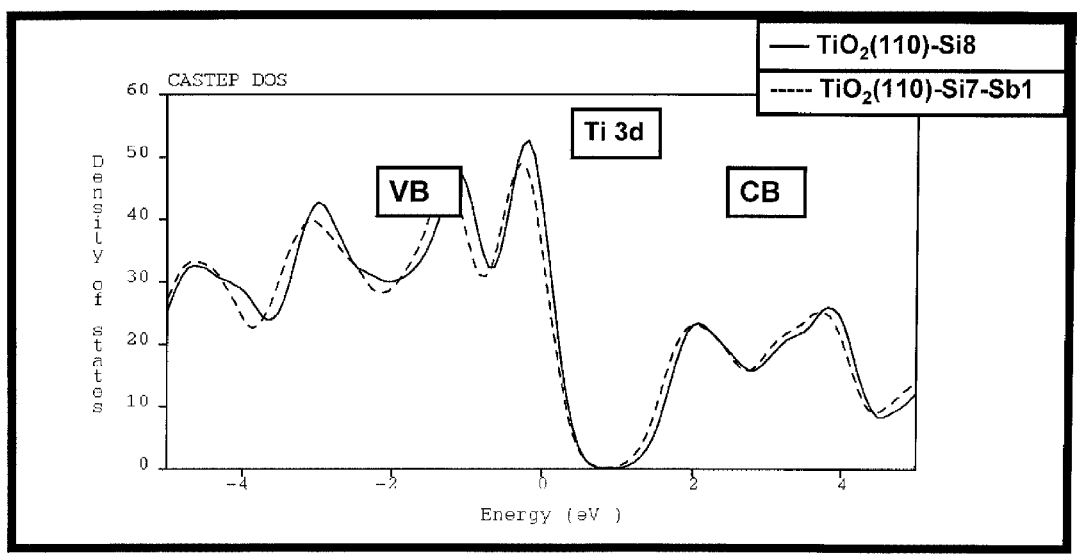
FIG. 4 shows the energy state density of the $TiO_2$ surface with $SiO_2$ coating and with Sb-doped $SiO_2$ coating.
Figure 5:
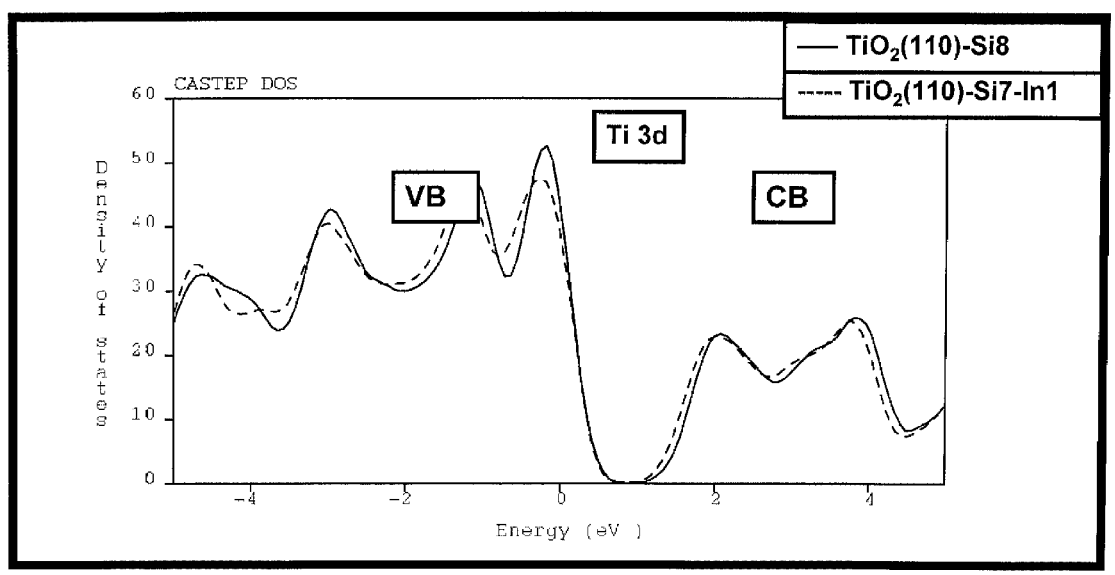
FIG. 5 shows the energy state density of the $TiO_2$ surface with $SiO_2$ coating and with In-doped $SiO_2$ coating.
Figure 6:
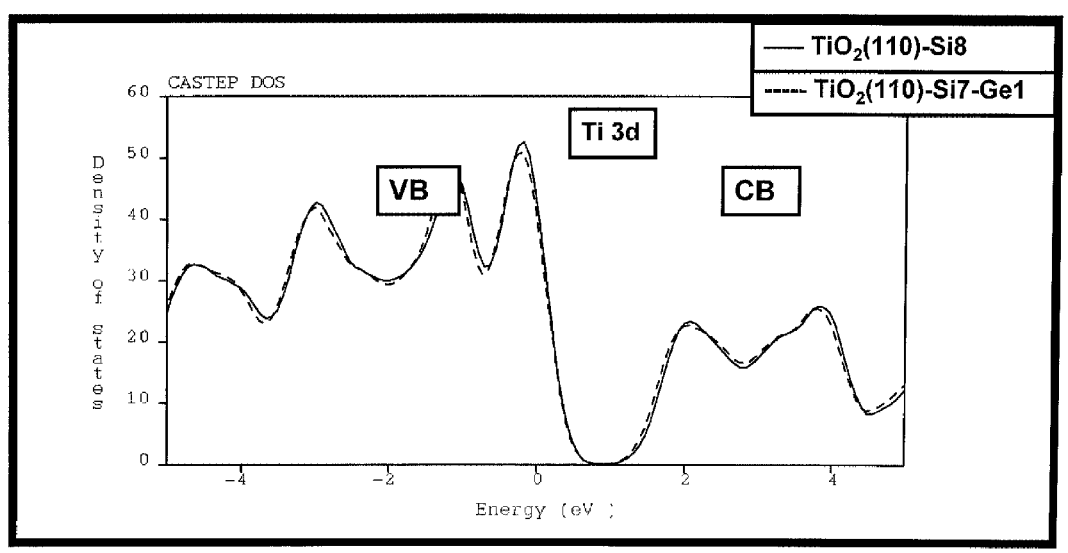
FIG. 6 shows the energy state density of the $TiO_2$ surface with $SiO_2$ coating and with Ge-doped $SiO_2$ coating.
Figure 7:
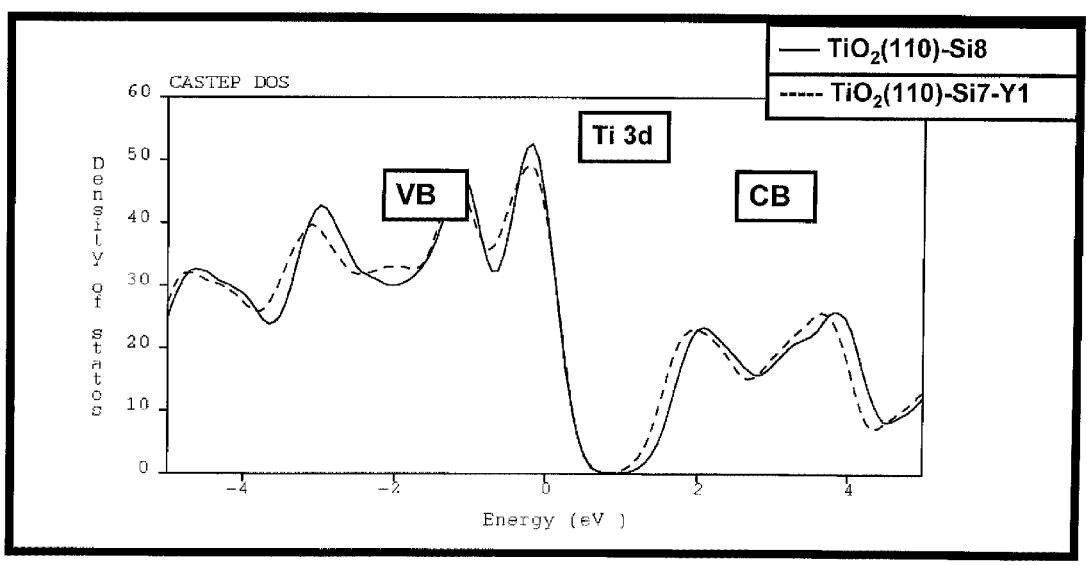
FIG. 7 shows the energy state density of the $TiO_2$ surface with $SiO_2$ coating and with Y-doped $SiO_2$ coating.

FIG. 3 shows the effect of doping the $SiO_2$ layer with Sn (Example 1) on the state densities, compared to the pure $SiO_2$ coating. In this case, there is a further reduction in the VB state density near the band edge, this leading to improved photostability.

Figure 8:
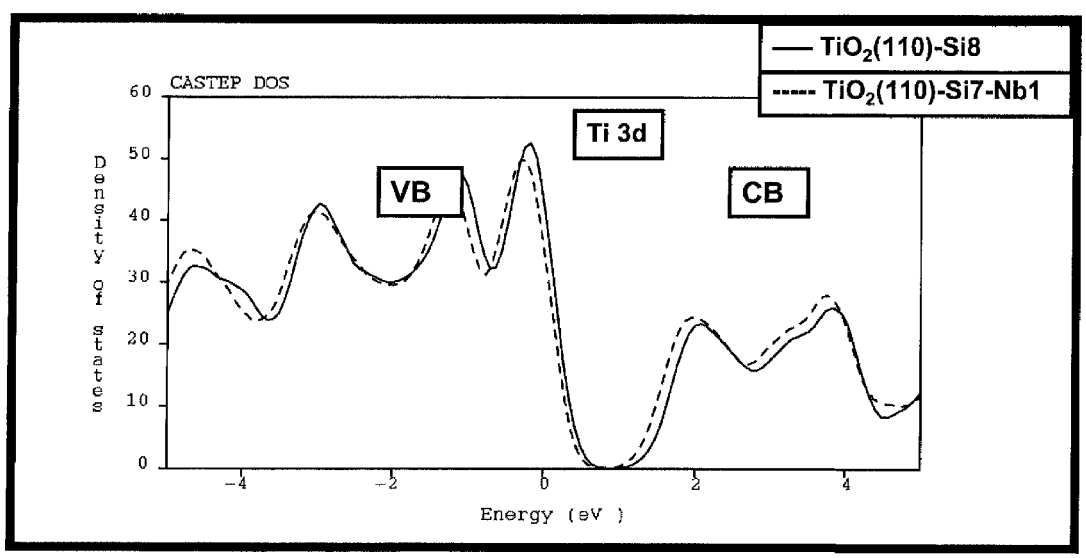
FIG. 8 shows the energy state density of the $TiO_2$ surface with $SiO_2$ coating and with Nb-doped $SiO_2$ coating.
Figure 9:
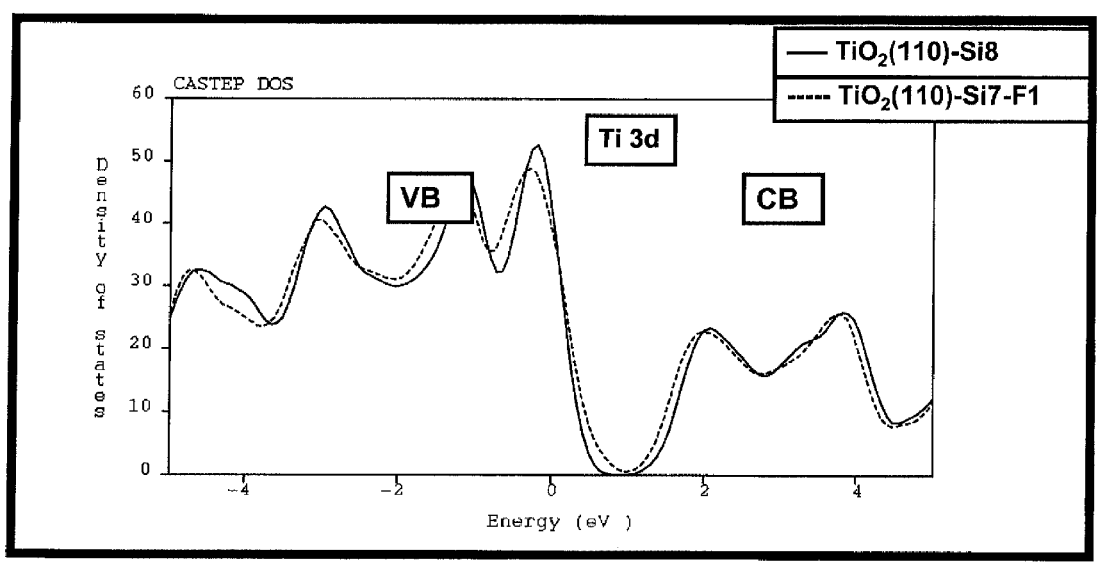
FIG. 9 shows the energy state density of the $TiO_2$ surface with $SiO_2$ coating and with F-doped $SiO_2$ coating.
Figure 10:
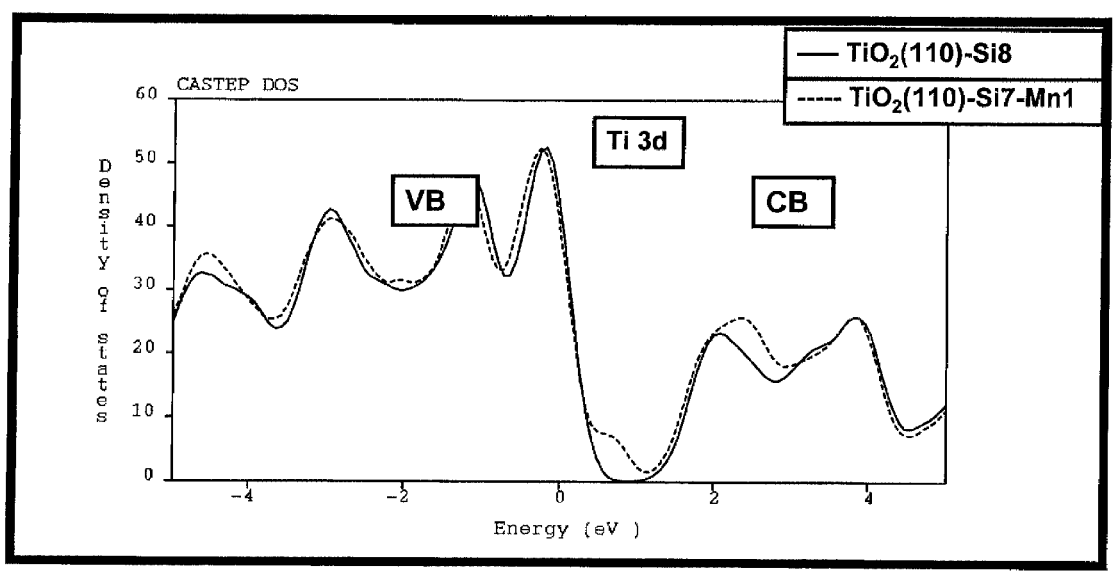
FIG. 10 shows the energy state density of the $TiO_2$ surface with $SiO_2$ coating and with Mn-doped $SiO_2$ coating.
Figure 11:
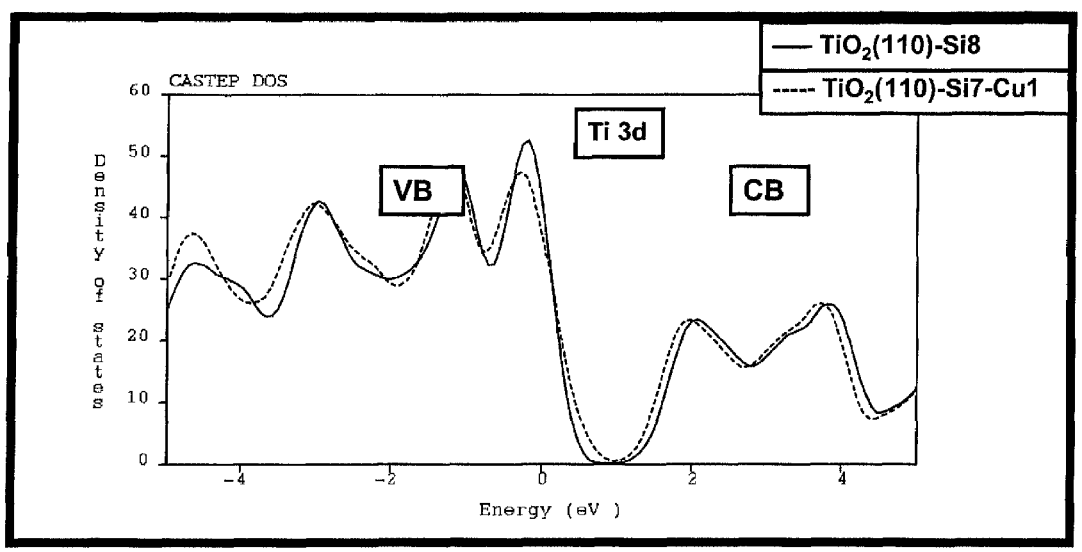
FIG. 11 shows the energy state density of the $TiO_2$ surface with $SiO_2$ coating and with Cu-doped $SiO_2$ coating.
Figure 12:
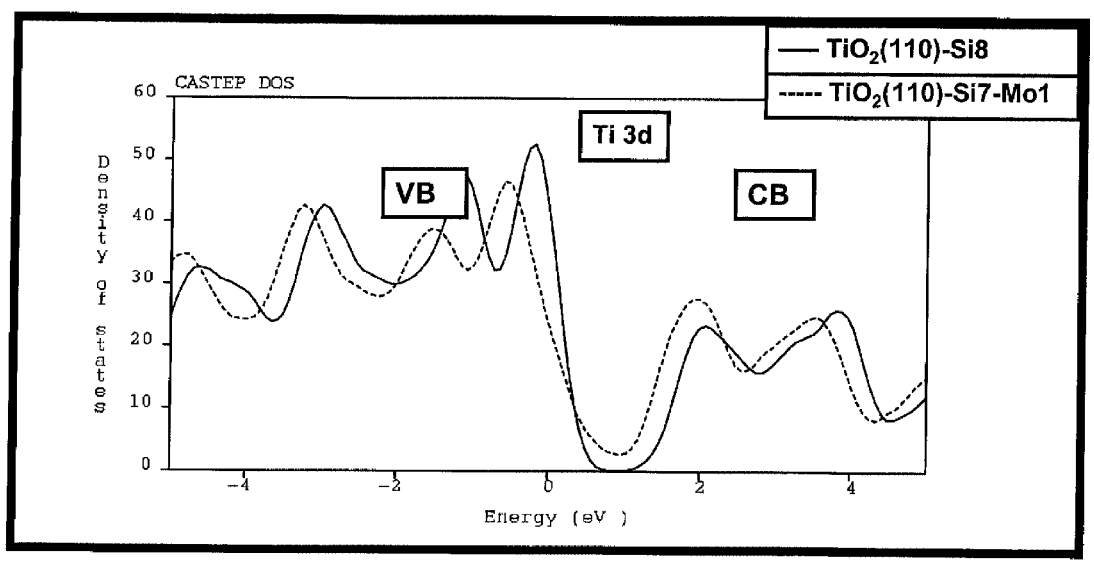
FIG. 12 shows the energy state density of the $TiO_2$ surface with $SiO_2$ coating and with Mo-doped $SiO_2$ coating.
Figure 13:
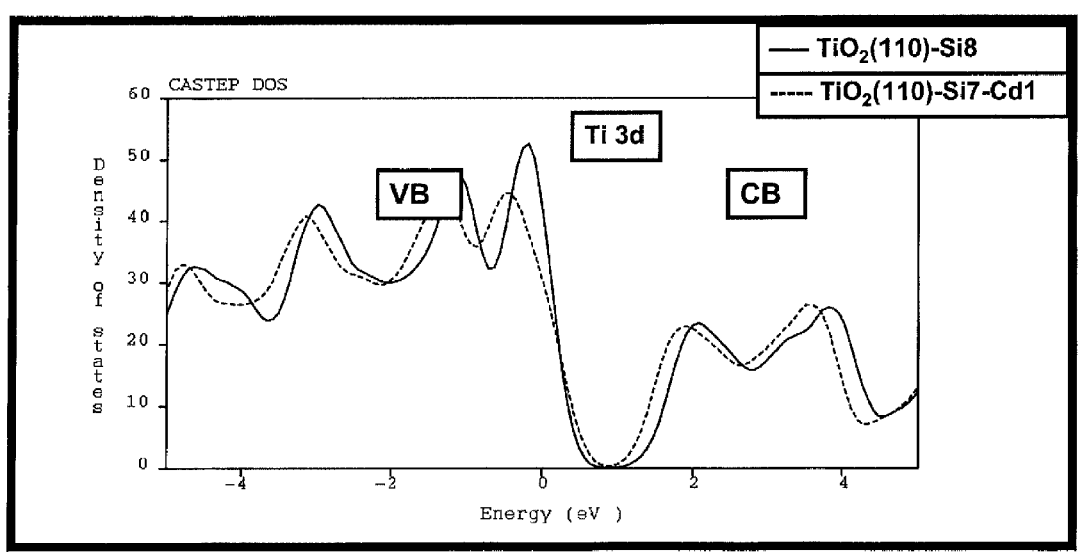
FIG. 13 shows the energy state density of the $TiO_2$ surface with $SiO_2$ coating and with Cd-doped SiO coating.
Figure 14:
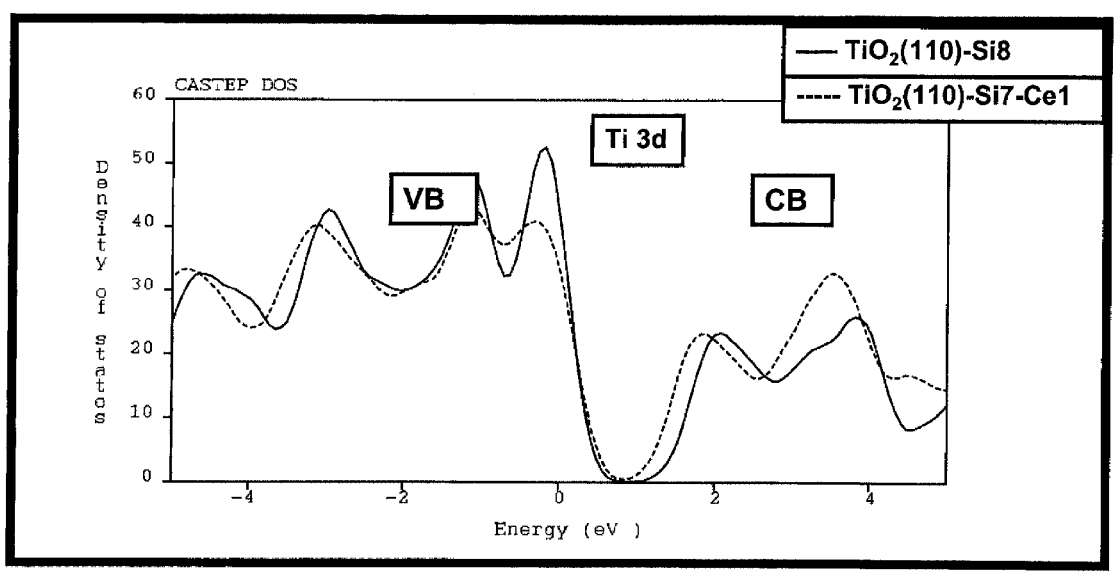
FIG. 14 shows the energy state density of the $TiO_2$ surface with coating and with Ce-doped $SiO_2$ coating.
Figure 15:
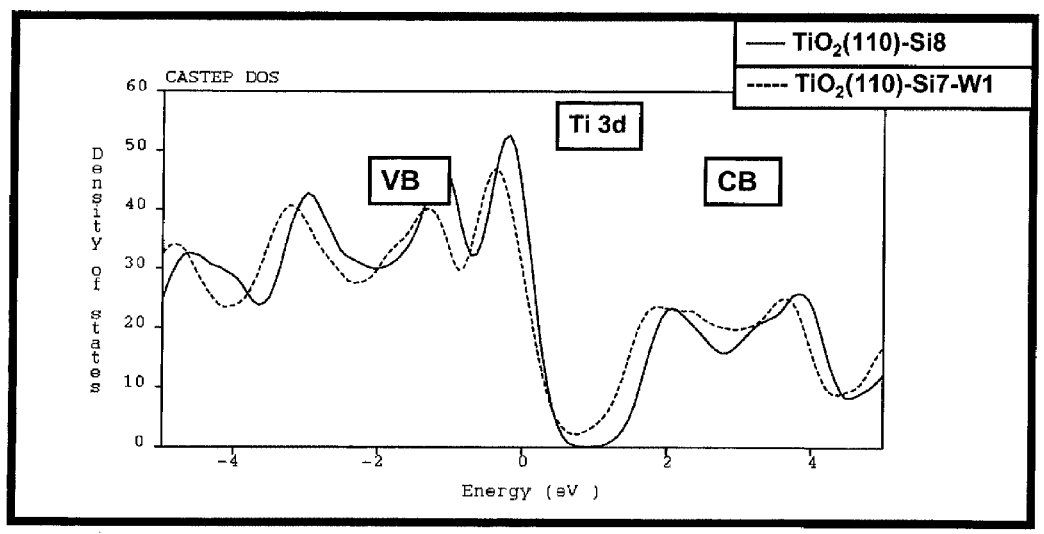
FIG. 15 shows the energy state density of the $TiO_2$ surface with $SiO_2$ coating and with W-doped $SiO_2$ coating.

FIGS. 4 to 8 show the respective effect of doping the $SiO_2$ layer with Sb (Example 2, FIG. 4), In (Example 3, FIG. 5), Ge (Example 4, FIG. 6), Y (Example 5, FIG. 7) and Nb (Example 6, FIG. 8). Surprisingly, a reduction in the VB state density near the band edge can be seen in each case, meaning that these coatings lead to an increase in photostability.

Similar doping of the $SiO_2$ layer with the elements Zr or Zn likewise leads to improved stability compared to an undoped $SiO_2$ layer.

Figure 16:
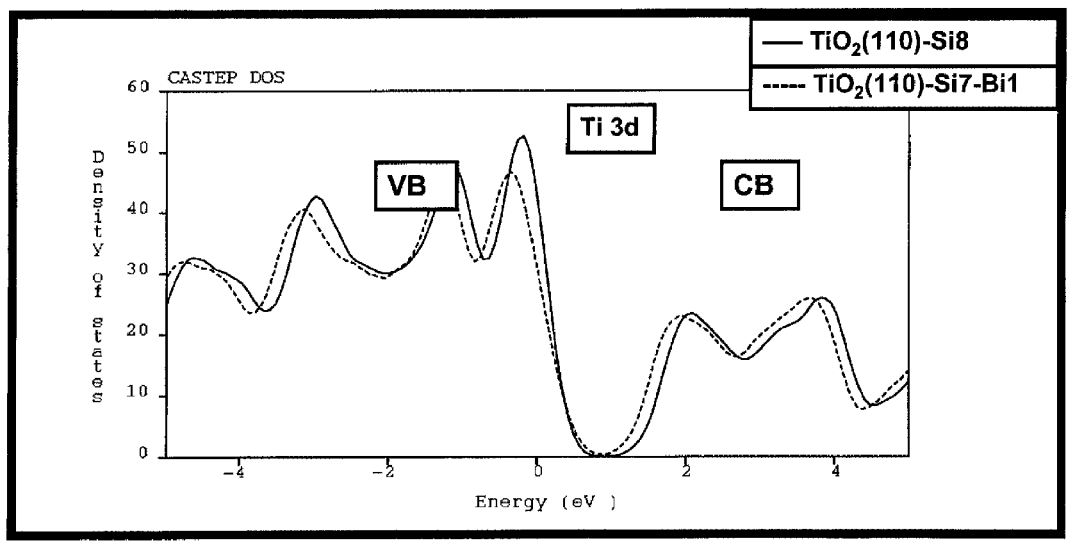
FIG. 16 shows the energy state density of the $TiO_2$ surface with $SiO_2$ coating and with Bi-doped $SiO_2$ coating.

FIGS. 9 to 16 show the respective effect of doping the $SiO_2$ layer with F (Example 7, FIG. 9), Mn (Example 8, FIG. 10), Cu (Example 9, FIG. 11), Mo (Example 10, FIG. 12), Cd (Example 11, FIG. 13), Ce (Example 12, FIG. 14), W (Example 13, FIG. 15) and Bi (Example 14, FIG. 16). Doping of the $SiO_2$ layer with F, Mn, Cu, Mo, Cd, Ce, W or Bi surprisingly leads to additional energy states within the band gap which serve as recombination centers for electron hole pairs and thus to an improved photostability.

Figure 17:
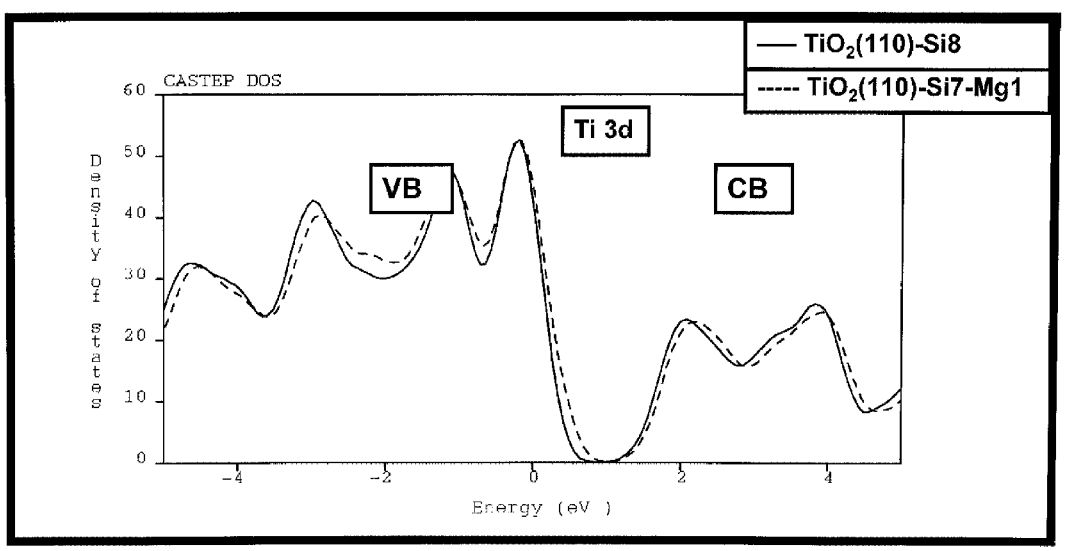
FIG. 17 shows the energy state density of the $TiO_2$ surface with $SiO_2$ coating and with Mg-doped $SiO_2$ coating.

FIG. 17 shows the effect of doping the $SiO_2$ layer with Mg (Comparative Example 2) on the energy state densities. In this case, there is an increase in the VB state density near the band edge, meaning that doping of the $SiO_2$ layer with Mg results in a loss of photostability.

Figure 18:
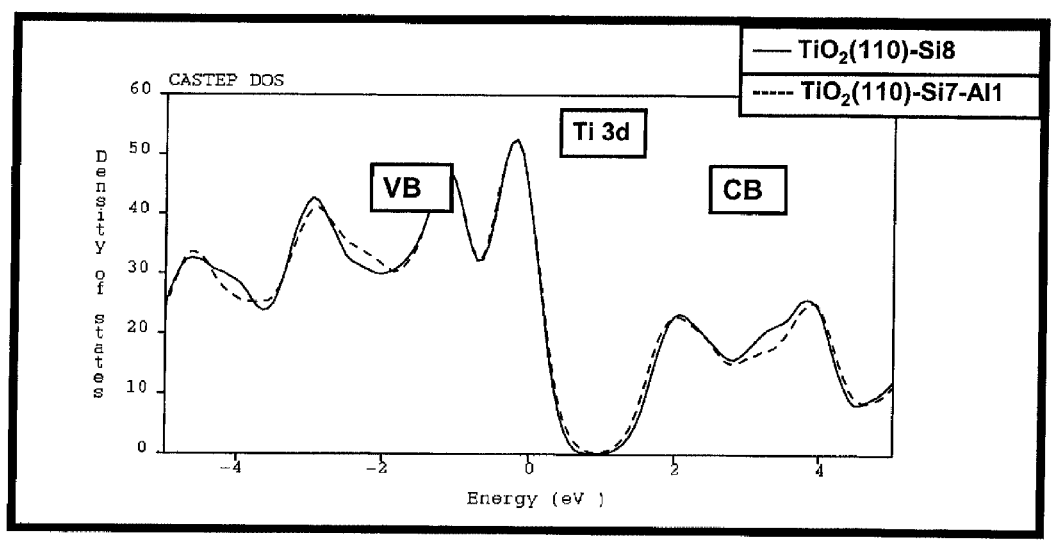
FIG. 18 shows the energy state density of the $TiO_2$ surface with $SiO_2$ coating and with Al-doped $SiO_2$ coating.

FIG. 18 shows the effect of doping the $SiO_2$ layer with Al (Comparative Example 3) on the energy state densities. In this case again, there is an increase in the VB state density near the band edge, meaning that doping of the $SiO_2$ layer with Al results in a loss of photostability.

The results of the state density calculations correlate precisely with the measurements of photostability in the experimentally doped samples. Thus, the calculations can be used to predict the usefulness of the elemental dopants without the much more difficult and time consuming trial and error experiments of trying to incorporate the dopants in the dense skins, and then measuring the photostability. One of skill in the art may use the results of the present specification to calculate and predict the results of any other dopant elements not mentioned specifically in this specification, for which the calculations have not yet been completed. Use of such dopant elements is claimed in this application, excluding only those dopant elements which have been experimentally found and published. The dopant elements known to the inventors which have previously been experimentally found and published are, for the dry process, Ag, Al, B, Ba, Be, Ca, Cd, Co, Cr, Cu, Mg, Mn, Ni, Pb, Sn, Sr, Ti, Zn, and Zr, and for the wet process, Al, B, Ge, Mg, Nb, P, and Zr. The inventors state that the results of the wet process may not necessarily be used to predict the results of the dry processes, and vice versa, so that separate applications are necessary for each process.

Process Control

Methods for coating titanium dioxide particles with dense $SiO_2$ as such are known. The traditional processes work via the aqueous phase. To this end, a $TiO_2$ particle suspension is produced, mixed with a dispersant where appropriate, and wet-milled where appropriate. The dense $SiO_2$ skin is customarily precipitated by adding alkali metal-silicate solutions and appropriate pH value control.

The doping element is added in the form of a salt solution, together with the silicate solution or separately before or after addition of the silicate solution. The person skilled in the art is familiar with the suitable compounds and necessary quantities for controlling the pH value in order to produce a dense skin.

Doping of the dense $SiO_2$ skin according to the invention can, for example, be achieved by adding the following salts to the suspension, where this compilation is not to be interpreted as a restriction of the invention.

Doping with Sb: antimony chloride, antimony chloride oxide, antimony fluoride, antimony sulphate
Doping with In: indium chloride, indium sulphate
Doping with Ge: germanium chloride, germanates
Doping with Y: yttrium chloride, yttrium fluoride
Doping with Nb: niobium chloride, niobates
Doping with F: flourine hydrogen, fluorides
Doping with Mn: manganese chloride, manganese sulphate
Doping with Cu: copper chloride, copper sulphate
Doping with Mo: molybdenum chloride, molybdates
Doping with Cd: cadmium chloride, cadmium sulphate
Doping with Ce: cerium nitrate, cerium sulphate
Doping with W: wolframates
Doping with Bi: bismuth nitrate, bismuth sulphate In a particularly preferred embodiment, an outer layer of hydrous aluminium oxide is additionally applied to the particles by known methods.

In another embodiment of the invention, the dense $SiO_2$ skin is deposited on the particle surface from the gas phase. Various methods are known for this purpose. For example, coating can be performed in a fluidised bed at temperatures below roughly 1,000° C. Methods of this kind are described in U.S. Pat. No. 3,552,995, GB 1 330 157 or US 2001 0041217 A1.

Alternatively, coating takes place in a tubular reactor directly following formation of the $TiO_2$ particles in the chloride process; these methods are described, for example, in patents or patent applications WO 98/036441 A1, EP 0 767 759 B1, EP 1042 408 B1 and WO 01/081410 A2. For coating in a tubular reactor, the precursor compound used for the $SiO_2$ is customarily a silicon halide, particularly $SiCl_4$, which is generally introduced downstream of the point where the reactants $TiCl_4$ and $AlCl_3$ are combined with the oxygen-containing gas. For instance, WO 01/081410 A2 indicates that the silicon halide is added at a point where the $TiO_2$ formation reaction is at least 97% complete. In any case, the temperatures at the point of introduction should be above 1,000° C., preferably above 1,200° C. The $SiO_2$ precursor compound is oxidised and deposited on the surface of the $TiO_2$ particles in the form of a dense silicon dioxide skin. In contrast to the wet-chemical method, water and hydrate-free oxide layers are formed during gas-phase treatment, these adsorbing hydroxyl ions and water molecules only on the surface.

The doping element is likewise added to the particle stream as a precursor compound, either in parallel with the $SiO_2$ precursor compound, or upstream or downstream. Here, too, the temperature of the particle stream at the point of introduction must be above 1,000° C., preferably above 1,200° C. The following compounds are suitable precursor compounds for the various doping metal oxides, although this compilation is not to be interpreted as a restriction of the invention:

Doping with Sn: tin halide, such as tin chloride
Doping with Sb: antimony halide, such as antimony chloride
Doping with In: indium halide, such as indium chloride
Doping with Y: yttrium halide, such as yttrium chloride
Doping with Zr: zirconium halide, such as zirconium chloride
Doping with Zn: zinc halide, such as zinc chloride
Doping with Nb: niobium halide, such as niobium chloride
Doping with F: fluorine, fluorine hydrogen, fluorides
Doping with Mn: manganese chloride
Doping with Cu: copper chloride
Doping with Mo: molybdenum chloride
Doping with Cd: cadmium chloride
Doping with Ce: cerium chloride
Doping with W: tungsten chloride
Doping with Bi: bismuth chloride In a particularly preferred embodiment, an outer layer of aluminium oxide is additionally applied to the particles by introducing a suitable aluminium oxide precursor compound, such as $AlCl_3$, into the particle stream farther downstream.

Finally, the titanium dioxide pigments provided with the doped, dense $SiO_2$ skin can be further treated by known methods, regardless of whether they were coated in a suspension or in the gas phase. For example, further inorganic layers of one or more metal oxides can be applied. Moreover, further surface treatment with nitrate and/or organic surface treatment can be performed. The compounds known to the person skilled in the art for organic surface treatment of titanium dioxide pigment particles are also suitable for organic surface treatment of the particles according to the invention, e.g. organosilanes, organosiloxanes, organophosphonates, etc., or polyalcohols, such as trimethylethane (TME) or trimethylpropane (TMP), etc.

The titanium dioxide pigment particles according to the invention are suitable for use in plastics, paints, coatings and papers. They can also be used as a starting basis for a suspension for producing paper or coatings, for example.

Obviously, many modifications and variations of the present invention are possible in light of the above teachings. It is therefore to be understood that, within the scope of the appended claims, the invention may be practiced otherwise than as specifically described. All of the above identified US provisional applications, patents, and reference material, including references contained therein, are hereby incorporated herein by reference in their entirety.

We claim:

1. Titanium dioxide ($TiO_2$) pigment particles, comprising:
   a) $TiO_2$ core particles;
   b) a dense silicon dioxide ($SiO_2$) skin covering the core particles, the dense skin produced in a wet-chemical process, the dense skin doped with at least one doping element, wherein the at least one doping element is selected from the group consisting of In, Ge, Y, Nb, F, Mo, W and Bi as well as mixtures thereof.

2. The $TiO_2$ pigment particles of claim 1, further comprising;
   c) a further coating of aluminium oxide or hydrous aluminium oxide upon the dense skin covering.

3. The $TiO_2$ pigment particles of claim 2, wherein the aluminium content of the further coating is 0.5 to 6.0% by weight calculated as $Al_2O_3$ and referred to the total pigment.

4. The $TiO_2$ pigment particles of claim 3, wherein the aluminium content of the further coating is 1.0 to 4.0% by weight.

5. The $TiO_2$ pigment particles of claim 1, wherein the silicon content of the dense skin is 0.1 to 6.0% by weight calculated as $SiO_2$ and referred to the total pigment.

6. The $TiO_2$ pigment particles of claim 5, wherein the silicon content of the dense skin is 0.2 to 4.0% by weight, calculated as $SiO_2$ and referred to the total pigment.

7. The $TiO_2$ pigment particles of claim 1, wherein the content of doping elements in the dense skin is 0.01 to 3.0% by weight calculated as oxide and in the case of F calculated as element.

8. The $TiO_2$ pigment particles of claim 7, wherein the content of doping elements in the dense skin is 0.05 to 2.0% by weight.

9. A method for manufacturing $TiO_2$ pigment particles whose surface is coated with a dense $SiO_2$ skin doped with at least one doping element comprising the steps:
   a) providing an aqueous suspension of $TiO_2$ core particles, the aqueous suspension having pH>10;
   b) adding an aqueous solution of an alkaline silicon component and at least one aqueous solution of a component containing at least one doping element, wherein at least one doping element is selected from the group consisting of In, Ge, Y, Nb, F, Mo, W and Bi as well as mixtures thereof;
   c) reducing the pH value of the suspension to a value<9 to produce a dense $SiO_2$ skin doped with at least one doping element deposited on the $TiO_2$ core particles.

10. The method of claim 9, further comprising;
    d) adding an aqueous solution of an aluminum containing component to the suspension to produce a further layer of aluminium oxide or hydrous aluminium oxide on the dense $SiO_2$ skin.

11. The method of claim 10, further comprising;
    e) adding an aqueous solution of an organic component to produce a further layer of organic material on the aluminium oxide or hydrous aluminium oxide layer.

12. The method of claim 11, further comprising;
    f) adding the $TiO_2$ pigment particles produced in step e) to a process for making plastics, paints, coatings or papers.

13. The method of claim 10, further comprising:
    e) adding the $TiO_2$ pigment particles produced in step d) to a process for making plastics, paints, coatings or papers.

14. The method of claim 9, wherein the silicon content of the dense skin is 0.1 to 6.0% by weight calculated as $SiO_2$ and referred to the total pigment.

15. The method of claim 14, wherein the silicon content of the dense skin is 0.2 to 4.0% by weight, calculated as $SiO_2$ and referred to the total pigment.

16. The method of claim 9, wherein the content of doping elements in the dense skin is 0.01 to 3.0% by weight calculated as oxide and in the case of F calculated as element.

17. The method of claim 16, wherein the content of doping elements in the dense skin is 0.05 to 2.0% by weight calculated as oxide and in the case of F calculated as element.

18. The method of claim 9, further comprising:
    d) adding the $TiO_2$ pigment particles produced in step c) to a process for mating plastics, paints, coatings or papers.

19. Titanium dioxide ($TiO_2$) pigment particles, comprising:
    a) $TiO_2$ core particles;
    b) a dense silicon dioxide ($SiO_2$) skin covering the core, the dense skin produced in a wet-chemical process, the dense skin doped with at least one doping element, wherein the at least one doping element either reduces the density of states near the band edge or creates additional states in the band gap of the material of the dense skin, excluding doping elements selected from the group consisting of Ag, Al, B, Ba, Be, Ca, Cd, Co, Ce, Cr, Cu, Mg, Mn, Ni, Pb, Sn, Sb, Sr, Ti, Zn, and Zr.

* * * * *